United States Patent [19]

Ness

[11] 4,040,512
[45] Aug. 9, 1977

[54] METHOD OF AND MEANS FOR INDEXING ARTICLES

[76] Inventor: Warren C. Ness, 6211 W. Touhy Ave., Chicago, Ill. 60648

[21] Appl. No.: 648,363

[22] Filed: Jan. 12, 1976

[51] Int. Cl.² .......................................... B65G 47/26
[52] U.S. Cl. ................................... 198/460; 198/466; 198/478; 198/579
[58] Field of Search ................... 198/21, 34, 76, 460, 198/461, 462, 488, 574, 794, 466, 576, 579, 478

[56] References Cited

U.S. PATENT DOCUMENTS

| | | | |
|---|---|---|---|
| 2,205,178 | 6/1940 | Schreiber | 198/461 X |
| 2,816,647 | 12/1957 | Ruth | 198/34 |
| 3,072,095 | 1/1963 | Keessen et al. | 198/34 X |
| 3,162,294 | 12/1964 | Dieter | 198/34 |
| 3,251,452 | 5/1966 | Conway et al. | 198/34 |
| 3,335,841 | 8/1967 | Klingel et al. | 198/34 |
| 3,568,818 | 3/1971 | Hanson | 198/34 |
| 3,572,495 | 3/1971 | Luginbuhl | 198/34 |
| 3,627,100 | 12/1971 | Bourbina et al. | 198/34 X |
| 3,661,243 | 5/1972 | Piatek | 198/34 |
| 3,751,873 | 8/1973 | Toby | 198/460 X |
| 3,805,944 | 4/1974 | Yuryan | 198/21 X |
| 3,817,368 | 6/1974 | Wentz et al. | 198/34 X |

Primary Examiner—Evon C. Blunk
Assistant Examiner—Richard R. Thomson
Attorney, Agent, or Firm—Eugene F. Friedman; Elmer L. Zwickel

[57] ABSTRACT

A conveyor system wherein randomly spaced articles are advanced on a conveyor at a predetermined rate of speed, and means made effective by the presence of an article in a predetermined position on said conveyor, to lift the article therefrom and advance it a predetermined distance at a greater speed than that of the conveyor so as to locate each article in uniform spaced relation to an article in advance thereof and reposition it on the conveyor.

13 Claims, 5 Drawing Figures

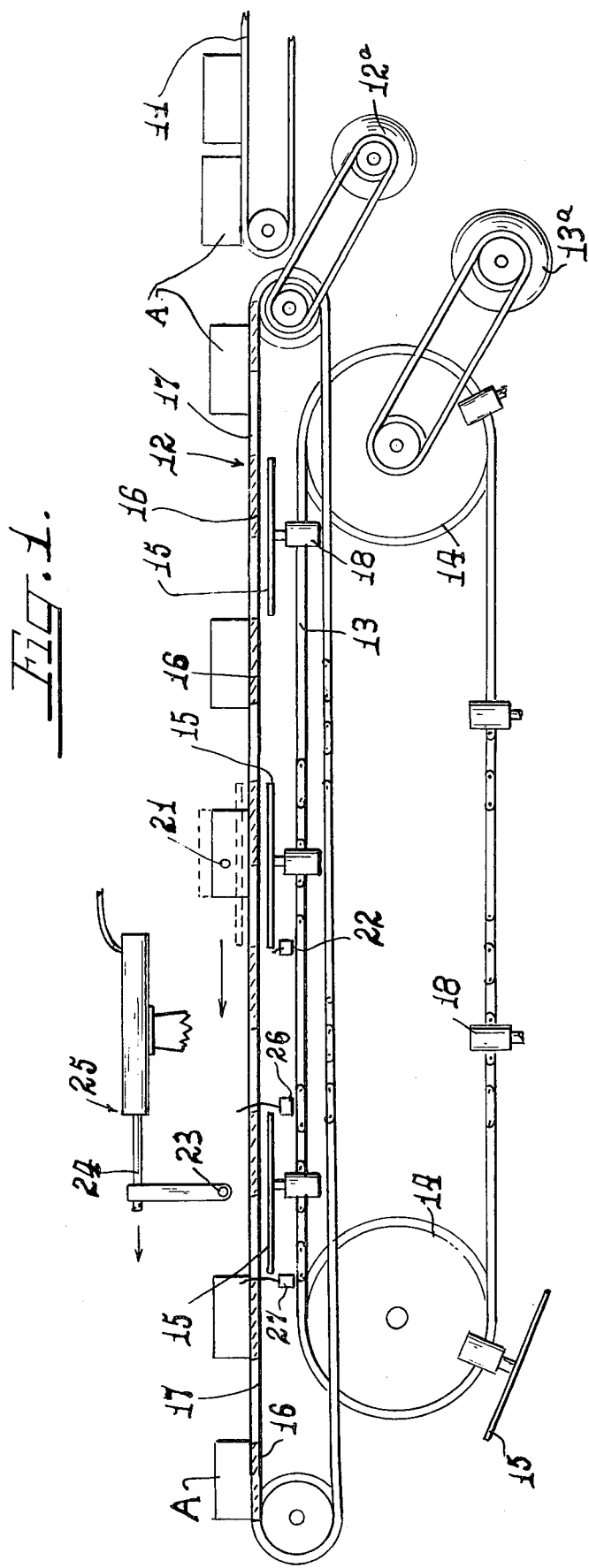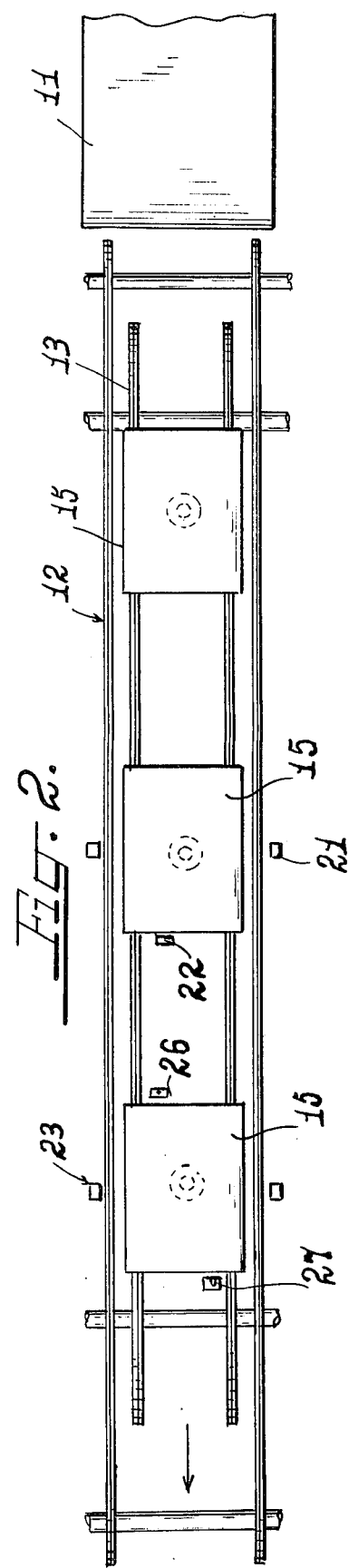

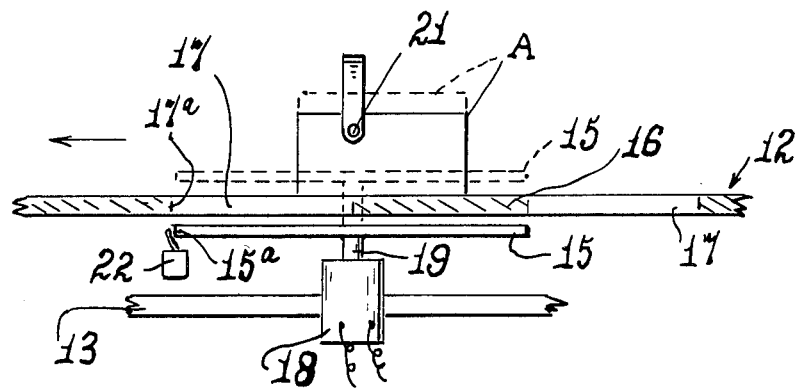
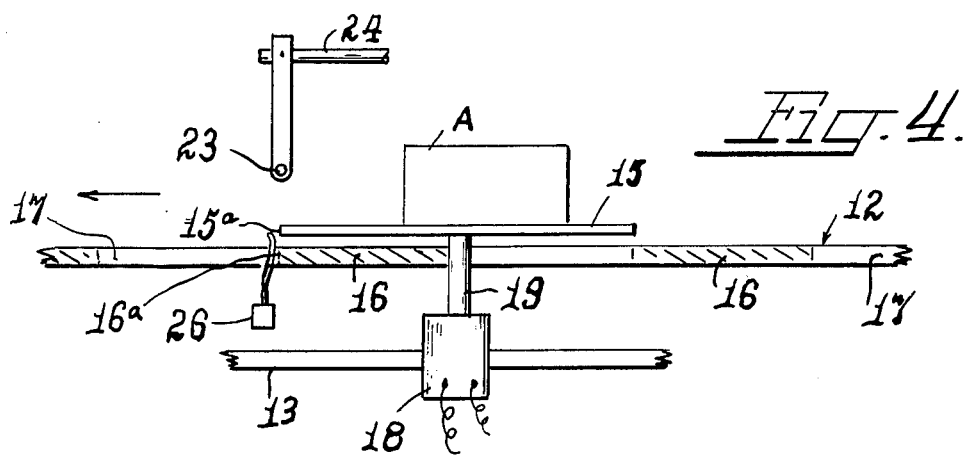
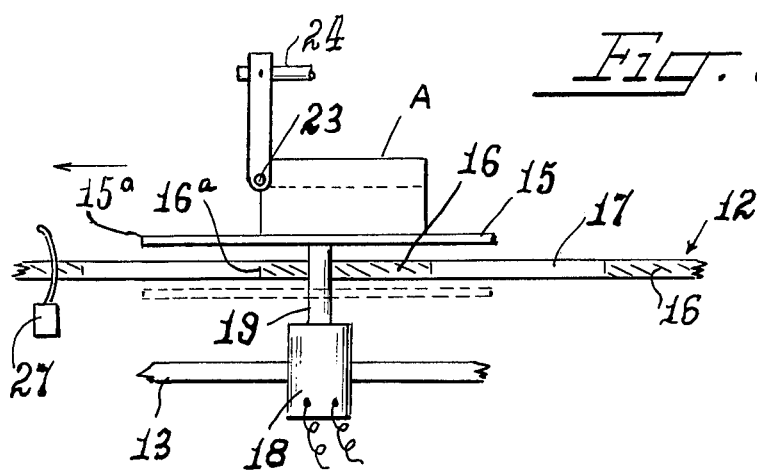

METHOD OF AND MEANS FOR INDEXING ARTICLES

This invention relates to the method of and means for indexing packages or articles of various sizes and shapes, and particularly those of a kind not having sufficient rigidity or firmness to be physically contacted which are deposited at random on a conveyor system, so as to result in their discharge from said system at known uniformly spaced intervals to facilitate advancing them from two or more conveyors (lanes) onto a single conveyor (lane) and/or to automatic equipment, for wrapping or boxing the individual packages or articles, or delivery of them to other equipment such as for example, a printing machine.

Many problems exist when it is essential to rearrange articles being conveyed in a random fashion into a uniformly indexed manner. For example, when two or more "lanes" of articles are being conveyed randomly side by side for delivery onto a single lane there will be many instances when an article in one lane will be advancing alongside, or substantially alongside, an aritcle in the adjacent lane. Hence in order to merge the two articles into a single lane it is common practice to advance or retract an article in one lane relative to an article in the adjacent lane in order to have both articles flow one behind the other onto the single lane. This has been and still is being done by bringing an article in one or both lanes to stop and then sequentially releasing the article at timed intervals so that an article in one lane will be ahead of or behind an article in the opposite lane, allowing the two articles to be merged in a single lane in predetermined spaced relationship.

Similarily, to transform a line of randomly spaced articles into a line of uniformly spaced articles such as may be required in order to feed the articles into a wrapping, cartoning or other type of automatic machine, the articles generally must heretofore be stopped and released in timed sequence of one sort or another. In many instances the commonly used indexing means is satisfactory since it, in fact, does alter the position of articles on a conveyor from a random position to an indexed position wherein they are uniformly spaced apart. However, here also, in all known instances, the method used is to stop, release, push, pull the article in some way.

In each to the aforesaid instances rearrangement of the articles necessitates applying holding means against the front, back, sides or top of the article. This is satisfactory if the article is of such weight, rigidity, and shape that will allow such physical handling but it is entirely unsatisfactory when dealing with an article that is irregular in shape, is fragile, unstable or for one reason or another will not allow physical contact with any surface other than the bottom side of the article; or articles that are not succeptible because of their fragibility, of having physical contact with another article such as occurs when the flow of articles on a conveyor is retarded physically.

The invention has for one of its objects the incorporation, in a conveyor system, of means whereby articles deposited at random on the conveyor system are selectively advanced predetermined distances along the conveyor without the use of stops, pushers, or gates, etc. More particularly, the conveyor system of the present invention incorporates means to separate articles, advancing one ahead of another in a single lane, to a desired minimum spacing or center distance; to then elevate an article from its conveyor surface and advance said article a predetermined distance therealong so as to locate it in a specific advanced position, which position is also a given distance behind a preceeding article on the conveyor surface. This means includes a (feed) conveyor and a main conveyor, the main conveyor running at a sufficiently greater speed than the feed conveyor so as to create minimum known spacing between articles deposited on the main conveyor, and a spacing conveyor system associated with the main conveyor having lifting elements thereon which are controlled by photoelectric cells and switches, or other sensing means; said sensing means being responsive to the presence or absence of an article advancing along the main conveyor. When the beam of light from a given photo cell is interrupted by the passage of an article thereinto and/or a given switch is activated either singularly or in series with a given photo cell, means is actuated to lift the sensed article from the main conveyor. While lifted, the article is advanced at a speed greater than the speed of the main conveyor for such distance as may be required to locate it in the desired position, whereupon the sensing means is interrupted and means is actuated to redeposit the article on the wall conveyor for delivery to the wrapping or packaging machine or onto another conveyor, machine, converger or system.

Another object of the invention is to provide novel means and method for changing the position of articles randomly deposited on a conveyor system into a predetermined indexed position thereon.

Another object is to provide a novel method and means to accomplish repositioning of an article on a conveyor without making physical contact with the article on any surface other than the bottom surface thereof and without stopping or slowing the rate of travel of the article.

Another object is to provide a method and means for advancing articles randomly spaced on two or more conveyors onto a single conveyor at uniformly spaced increments without interference one with the other.

Another object is to provide a novel method and means for effecting uniform spacing of randomly spaced articles which is entirely automatic in operation, inexpensive to operate, and one which does not impede the advance of or cause damage to said articles.

Other objects and advantages of the invention will become apparent with reference to the following description and accompanying drawings.

IN THE DRAWINGS

FIG. 1 is a side elevational view of a representative conveyor system used in practicing the method of the invention.

FIG. 2 is a plan view of the conveyor system shown in FIG. 1.

FIG. 3 is a detail representative view of initial positioning of an article on the conveyor system.

FIG. 4 is a detail representative view of the intermediate positioning of an article on the conveyor system.

FIG. 5 is a detail representative view of the final positioning of an article on the conveyor system.

Referring to the representative disclosure of a conveyor system used in practicing the method of the invention, the structure disclosed for purposes of illustration comprises a feed conveyor 11, an advancing or main conveyor 12 and a lifting conveyor 13 associated with the main conveyor operable for selective advancement of articles along the main conveyor at twice the speed of travel of the main conveyor.

More particularly, the feed conveyor 11 may be of any conventional construction and it is operated at a speed half that of the main conveyor 12, driven by motor 12a, so that articles "A" delivered from said feed conveyor to the main conveyor will be advanced therewith at a greater speed than the delivery speed of articles leaving the feed conveyor so as to obtain minimum spacing between the articles. In this instance, the minimum spacing is equal to one article length.

Closely associated with and running parallel to the main conveyor 12 is the lift conveyor 13 comprised of an endless chain trained over sprockets 14 and driven by motor 13a, carries a series of longitudinally spaced lift platform 15. For purposes of illustration only, the main conveyor 12 is shown alternatly divided into "article portions" 16 (shown shaded) and "space portions" 17 (not shaded). Each of these portions is of a length equal to the length of an article A being conveyed thereon. Each platform 15 is equal in length to the combined total of one article-portion 16 and one space-portion 17 on the main conveyor 12, and the platforms are spaced apart one from the other a distance equal to one platform length.

Each of these platforms 15, which are twice the length of article A, normally lie below the plane of conveyor 12 (full lines-FIG. 3) and are each connected to chain conveyor 13 by means of a solenoid 18 having its core 19 secured to the lift platform so that when a solenoid is activated, the related lift platform 15 is elevated above the plane of conveyor 12 (dotted lines -FIG. 3) to lift an article A thereover off of said conveyor.

The lift conveyor 13 is operated at a speed twice the speed of the main conveyor 12 for a purpose to be made known in detail presently. Located above the main conveyor and spaced longitudinally from its article receiving end is a photo-cell 21, or other sensing means. If an article on conveyor 12 is interrupting the beam of said photo-cell at the very instant a pulsed switch 22 is momentarily energized by the lead edge of platform 15, the related solenoid 18 is actuated to lift the related lift platform 15 and lift the article off of the conveyor 12. Once lifted the solenoid 18 is sustained in energized condition by a latching switch, the article A is advanced at twice the speed of conveyor 12. Further along the conveyor 12 is a second photocell 23 (FIG. 4) which is carried on a reciprocable piston rod 24 forming a part of an air-cylinder assembly 25. When an article A advancing along with the elevated lift platform 15 interrupts the beam of cell 23 (FIG. 5) a signal is caused to deenergize through the latching switch solenoid 18 thereby lowering the lift platform to cause the article to be repositioned on the main conveyor 12 and be advanced at the speed of the main conveyor.

The above described representative structure will best be understood upon reference to the following description of the method of conveying and specifically locating articles on the main conveyor.

OPERATION

In operation, the lifting conveyor 13 is running at twice the speed of main conveyor 12 and main conveyor 12 is running twice the speed of feed conveyor 11. In the exemplary disclosre each article A of a succession of articles is twelve inches long and it is desired to deliver them at the discharge end of conveyor 12 at a specific instant and spaced 12 inches apart (whenever there are sufficient numbers of articles entering the system to so fill the system). As heretofore stated, the main conveyor 12 is theoretically divided alternately into "space portions" 17 and "article portions" 16, each of the same length as the package which is, in this instance, twelve inches long. The specific purpose of the assembly is to locate an article A precisely on one of the "article portions" 16.

Initially, if the leading edge of an article A is deposited from the feed conveyor anywhere within a "space portion" of the main conveyor 12 (as shown in FIG. 3) the following will occur:- At an instant when the leading edge 15a of a lifting platform 15 is in a so-called "zero" position (i.e., aligned with the lead edge 17a of a "space portion" 17 and below same) the beam of photo cell 21 is interrupted by the presence of article A in its beam and, with the lead edge 15a of platform 15 in contact with pulse switch 22 will cause the platform to rise. Specifically, as best shown in FIG. 3, "zero" position of lift platform 15 is that instant at which its leading edge 15a is in exact alignment with the leading edge 17a of its correlative "space portion" 17 of the main conveyor 12 and simultaneously the pulse switch 22 is momentarily activated to (in series with signal from photo cell 21) energize solenoid 18 and raise the platform into the elevated postion shown in dotted lines in FIG. 3.

As previously noted, the lifting station 15 is traveling at a rate of twice the speed of the main conveyor 12, thus article A is carried on the elevated platform 15 a distance of two feet in the time that the main conveyor has advanced only one foot. Lift station 15 is now in position (FIG. 4) of "zero-plus one" (i.e., its leading edge 15a is now in exact alignment with the leading edge 16a of its correlative "article portion" 16). When the lead edge 15a of platform 15 contacts a dual purpose 26, the photo cell 23 will be advanced in the same direction, and at the same speed, as conveyor 12; that is, at one-half the speed of platform 15.

Because article A is still seated on lift platform 15 while the platform is elevated and is traveling at a rate of of speed twice that of the main conveyor and twice the rate of speed of photo cell 23, the advancing article A will at some instant during the forward stroke of carrier rod 24 enter and cause the beam of photo cell 23 to be broken. At the same instant this occurs (FIG. 5) photo cell 23, the leading edge of article A, and the leading edge 16a of the correlative "article portion" 16 will all be in exact alignment and the signal from photo cell 23 will cause solenoid 18 to de-energize and the lift platform will drop down and redeposit the article A on the main conveyor. The 12 inch article is thus deposited in a twelve inch "article portion" 16 on the main conveyor.

If the platform has not been thus retracted, dual purpose pulse switch 27 (FIG. 5) will be actuated by contact of the lead edge 15a of said elevated platform 15 to de-energize its correlative solenoid 18 and cause lowering of said platform. This action of switch 27 is necessary because an empty platform, not raised in zero position by actuation of switch 22 and photo cell 21, will be lifted when contacting pulse switch 26. Thus, switch 27 serves as a back-up to assure that all platforms are in their lowered position at the end of their useful run. Activation of switch 27, as noted above, is also necessary to cause photo-cell 23 to move in a reverse direction back to is initial position during the time that one "article portion" 16 and one "space portion" 17 of the main conveyor are passing beneath its line of travel.

This sequence of operation is repeated for each succeeding article deposited on the main conveyor 12. However, should an article enter and fall (i.e., the leading edge of an article) on an "article portion" instead of on a "space portion," upon reaching the zero-position (FIG. 39 the correlative platform 15 will not be elevated, even though switch 22 is pulsed. The article, with its leading edge still resting on an "article portion" of main conveyor 12 will continue to advance with the main conveyor. When the article seated on the "article portion" of conveyor 12, reaches the zero=plus-one position (FIG. 4) the correlative empty platform 15 (still down) contacts and causes switch 26 to be pulsed causing the platform to rise, whereupon the previously described action of photo-cell 23 and/or switch 27 will be repeated.

Although the foregoing description has been concerned with the handling of articles 12 inches long and correlated "space" and "article" portions on the conveyor are 12 inches long, the method and means is adaptable for handling of articles of other lengths, at difference speed relationships, and with varying lengths and relationships of "article" and "space" portions. To this end readjustment would be determined substantially as follows:

The length of lift platforms 15 is equal to the combined total length of one "article portion" 16 and one "space portion" 17 of the main conveyor. For example, if it is desired to deliver 9 inch articles on 12 inch center distance, the main conveyor would be (for purposes of illustration) segmented into an endless series of 9 inch "article portions" and 3 inch "space portions". Hence, the length of the lift platform will be 12 inches.

The distance between the lift platforms 15 is directly related to their respective length and the speed relationship of the main conveyor 12 to lifting conveyor 13. If it is desired that the lifting conveyor be run at a speed 25% greater than that of the main conveyor, then 0.25 becomes a multiplier to establish distance between platforms. Further in example just cited; the 12 inch platform length is multiplied by the 0.25 speed ratio factor, determining that the distance between platforms equals 3 inches. The general expression stating this relationship is $$x = [s_1/s_2 - 1]X$$

where
 x is the distance between adjacent platform,
 $s_1$ is the speed of the lifting conveyor,
 $s_2$ is the speed of the main conveyor, and
 X is the length of each platform.

Although I have described a preferred embodiment of my invention, in considerable detail, it will be understood that the description thereof is intended to be illustrative and not restructive, as details of the steps of the method and structure may be modified or changed without departing from the spirit or scope of the invention. Accordingly, I do not desire to be restricted to the exact steps of the method and the construction shown and described.

I claim:

1. An apparatus for sequentially indexing a first article having at least a predetermined minimum overall spacing behind a second article on a conveyor wherein said overall spacing includes the spacing between said first and said second article and the length of said first article, said apparatus comprising:
    a. sensing means for determining the position of said first article on said conveyor; and
    b. positioning means responsive to said sensing means for:
        1. lifting said first article from said conveyor if said sensing means indicates that said first article is mispositioned;
        2. moving said first article if thusly lifted at a speed greater than the speed of said conveyor; and
        3. placing said first article on a surface at a position where it will lie a positive integral number of unit lengths behind said second article, said unit length being longer than the lengths of said first and second articles and no longer than said minimum overall spacing.

2. The apparatus of claim 1 wherein said surface is a moving surface.

3. The apparatus of claim 2 wherein said positioning means includes a platform making contact with the bottom of said first article and lifting said first article from said conveyor.

4. The apparatus of claim 3 including a plurality of spaced-apart platforms each similar to said platform, each of said platforms having a length in the direction in which said positioning means moves said first article about equal to said unit length.

5. The apparatus of claim 4 wherein said platforms move in said direction with a uniform speed and the space x between adjacent platforms is given by the expression:

$$x = \left[\frac{s_1}{s_2} - 1\right] X \text{ (said length of said platforms)}$$

wherein:
 $s_1$ is said uniform speed
 $s_2$ is the speed of said conveyor.

6. The apparatus of claim 5 wherein, when one of said series of platforms lifts said first article, said one platform extends beyond the horizontal perimeter of said first article at substantially all points of said perimeter.

7. The apparatus of claim 2 further including timing means for delivering said second article on said moving surface to a predetermined location at one of a plurality of preselected relative times.

8. The apparatus of claim 2 further including second sensing means for determining the position of said first article while lifted by said positioning means from said conveyor.

9. The apparatus of claim 2 wherein said positioning means treats all articles on said conveyor following said first article independently of the position of said first article.

10. The apparatus of claim 2 wherein said positioning means touches said first and second articles only on their horizontal surfaces.

11. An apparatus for sequentially indexing a first article behind a second article on a conveyor comprising:
    a. sensing means for determining the position of said first article on said conveyor; and
    b. positioning means responsive to said sensing means for:
        1. lifting said first article from said conveyor if said sensing means indicates that said first article is mispositioned;

2. moving said first article if thusly lifted at a speed different than the speed of said conveyor; and
3. placing said first article on a surface at a position where it will lie at positive integral number of unit lengths behind said second article, said unit length being longer than the lengths of said first and second articles, said positioning means touching said first and second articles only on their horizontal surfaces.

12. A method for sequentially indexing a first article having at least a predetermined minimum overall spacing behind a second article on a conveyor comprising:
   a. determining the position of said first article on said conveyor;
   b. lifting said first article from said conveyor if said first article is determined to be mispositioned without contacting the edges of said first article;
   c. moving said first article if thusly lifted at a speed greater than the speed of said conveyor; and
   d. placing said first article on a surface at a position where it will lie a positive integral number of unit lengths behind said second article, said unit length being longer than the lengths of said first and second articles and no longer than said minimum overall spacing.

13. A method for sequentially indexing a first article behind a second article on a conveyor comprising:
   a. determining the position of said first article on said conveyor;
   b. lifting said first article from said conveyor if said first article is determined to be mispositioned, without contacting any edge of either said first or second article;
   c. moving said first article if thusly lifted at a speed different than the speed of said conveyor; and
   d. placing, without contacting any edge of either said first or said second article, said first article on a surface at a position where it will lie a positive integral number of unit lengths behind said second article, said unit length being longer than the lengths of said first and said second article.

* * * * *

UNITED STATES PATENT OFFICE
CERTIFICATE OF CORRECTION

Patent No. 4,040,512  Dated August 9, 1977

Inventor(s) Warren C. Ness

It is certified that error appears in the above-identified patent and that said Letters Patent are hereby corrected as shown below:

Column 1, line 45, before "pull" should appear the word --or--.

Column 1, line 47, "to" should be --of--.

Column 2, line 24, "wall" should be --main--.

Column 3, line 15, "carries" should be --carrying--.

Column 3, line 16, "platform" should be --platforms--.

Column 3, line 65, before "twice" should appear the word --at--.

Column 3, line 66, "disclosre" should be --disclosure--.

Column 4, line 36, after "purpose" should appear the word --switch--.

Column 4, line 43, "of of" should be --of--.

UNITED STATES PATENT OFFICE
CERTIFICATE OF CORRECTION

Patent No. 4,040,512      Dated August 9, 1977

Inventor(s) Warren C. Ness

It is certified that error appears in the above-identified patent and that said Letters Patent are hereby corrected as shown below:

Column 4, line 68, "is" should be --its--.

Column 5, line 8, "(FIG. 39" should be --(FIG. 3)--.

Column 5, line 42, before "example" should appear the word --the--.

Column 5, line 58, "restructive" should be --restrictive--.

Column 7, line 4, "at" should be --a--.

Signed and Sealed this

Second Day of May 1978

[SEAL]

Attest:

RUTH C. MASON  
Attesting Officer

LUTRELLE F. PARKER  
Acting Commissioner of Patents and Trademarks